US012482409B2

(12) United States Patent
Wang et al.

(10) Patent No.: US 12,482,409 B2
(45) Date of Patent: Nov. 25, 2025

(54) PASSIVE DISPLAY APPARATUS WITH LIGHT-EMITTING ELEMENTS

(71) Applicant: AUO Corporation, Hsinchu (TW)

(72) Inventors: Hsien-Chun Wang, Hsinchu (TW); Hsin-Chun Huang, Hsinchu (TW); Hsiao-Wei Cheng, Hsinchu (TW); Yang-En Wu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/740,487

(22) Filed: Jun. 11, 2024

(65) Prior Publication Data

US 2025/0095552 A1 Mar. 20, 2025

(30) Foreign Application Priority Data

Sep. 15, 2023 (TW) ................................ 112135279

(51) Int. Cl.
*G09G 3/36* (2006.01)
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2310/08* (2013.01)

(58) Field of Classification Search
CPC ............. G09G 3/32; G09G 2310/0257; G09G 2310/0286; G09G 2310/08
See application file for complete search history.

(56) References Cited

U.S. PATENT DOCUMENTS

| | | | | | |
|---|---|---|---|---|---|
| 6,369,786 | B1 * | 4/2002 | Suzuki | G09G 3/2022 | 345/82 |
| 10,559,274 | B2 | 2/2020 | Xi et al. | | |
| 10,854,166 | B2 | 12/2020 | Xi et al. | | |
| 2003/0151570 | A1 | 8/2003 | LeChevalier et al. | | |
| 2006/0077738 | A1 * | 4/2006 | Kwon | G09G 3/3283 | 365/203 |
| 2006/0290615 | A1 * | 12/2006 | Kim | G09G 3/3216 | 345/76 |
| 2011/0080434 | A1 * | 4/2011 | Tagawa | G09G 3/3291 | 345/83 |
| 2022/0262300 | A1 * | 8/2022 | Hung | G09G 3/2007 | |
| 2023/0055746 | A1 * | 2/2023 | Ozbas | G09G 3/3426 | |

* cited by examiner

*Primary Examiner* — Sanghyuk Park
(74) *Attorney, Agent, or Firm* — JCIPRNET

(57) ABSTRACT

Disclosed is a passive display apparatus. The passive display apparatus includes multiple light-emitting elements, a scanning circuit, multiple scanning switches, and a current control circuit. The light emitting elements are arranged in an array. The scanning circuit is coupled to the light-emitting elements and has multiple scan shift registers to generate multiple scan signals enabled sequentially. The scanning switches receive the scan signals and a first operating voltage to provide the first operating voltage to the light-emitting elements row by row. The current control circuit is coupled to the light-emitting elements, and receives multiple pixel voltages to provide multiple light-emitting currents to the light-emitting elements. The light-emitting elements emit light based on the received light-emitting currents.

6 Claims, 7 Drawing Sheets

151a

PASSIVE DISPLAY APPARATUS WITH LIGHT-EMITTING ELEMENTS

CROSS-REFERENCE TO RELATED APPLICATION

This application claims the priority benefit of Taiwan application serial no. 112135279, filed on Sep. 15, 2023. The entirety of the above-mentioned patent application is hereby incorporated by reference herein and made a part of this specification.

BACKGROUND

Technical Field

The disclosure relates to a display apparatus, and in particular to a passive display apparatus.

Description of Related Art

With the evolution of display technology, display panels with high resolution and thinness are popular on the mainstream market. In recent years, due to breakthroughs in the manufacturing technology of light-emitting diode (LED) elements, micro-LEDs display apparatuses have been developed by arranging light-emitting diode elements in an array. Compared to organic LED display apparatuses, light-emitting diode display apparatuses using inorganic materials have excellent reliability and longer service life. Additionally, due to the self-luminous characteristic of the light-emitting diode, there is no need to provide a liquid crystal layer and a color filter, which may further reduce the thickness of the display apparatus.

However, since the light-emitting diode display uses a current-driven structure, the pixel circuit often requires a more complex circuit for compensation and improvement under consideration of the variation of the transistor element and the influence of resistance drop (IR drop). Therefore, being limited by the number of transistors, a capacitor configuration and a trace design lead to the following problems: difficulty in the development of high resolution display panels, complexity of the detecting method of pixels in the panel, and high production costs of making the transistor elements caused by the demand for a large area of low temperature poly-silicon (LTPS) substrates.

SUMMARY

The disclosure provides a passive display apparatus, which can reduce elements in a pixel array to improve the resolution of a display panel and simplify a detecting method of pixels in the display panel.

A passive display apparatus of the disclosure includes multiple light-emitting elements, a scanning circuit, multiple scanning switches, and a current control circuit. The light-emitting elements are arranged in an array. The scanning circuit is coupled to the light-emitting elements and has multiple scan shift registers to generate multiple scan signals enabled sequentially. The scanning switches receive the scan signals and a first operating voltage to provide the first operating voltage to the light-emitting elements row by row. The current control circuit is coupled to the light-emitting elements and receives multiple pixel voltages to provide multiple light-emitting currents to the light-emitting elements, where the light-emitting elements emit light based on the received light-emitting currents.

Based on the above, in the passive display apparatus according to the embodiments of the disclosure, only the light-emitting elements and traces are retained in the pixel array, and the relevant driving elements are moved to the periphery. In this way, the resolution of the pixel array may be greatly improved, and the complexity of detection may be simplified, so that the yield rate of the panel may be improved.

In order to make the above-mentioned features and advantages of the invention more comprehensible, the following specific embodiments are described in detail together with the accompanying drawings.

DESCRIPTION OF THE EMBODIMENTS

Unless otherwise defined, all terms (including technical and scientific terms) used herein have the same meaning as commonly understood by people having ordinary skill in the art to which the disclosure belongs. It is further understood that the terms such as the terms defined in commonly used dictionaries should be interpreted as having meanings consistent with the relevant art and the background or context of the disclosure, and should not be interpreted in an idealized or overly formal manner, unless otherwise defined in the embodiments of the disclosure.

It should be understood that, although the terms "first", "second", "third", etc. may be used herein to describe various elements, components, regions, layers and/or portions, these elements, components, regions, layers, and/or portions should not be limited by these terms. These terms are only used to distinguish one element, component, region, layer, or portion from another element, component, region, layer, or portion. Thus, a "first element", "component", "region", "layer", or "portion" discussed below could be termed a second element, component, region, layer, or portion without departing from the teachings herein.

The terminologies used herein are only for the purpose of describing particular embodiments and are not restrictive. As used herein, the singular forms "a," "an," and "the" are intended to include the plural forms including "at least one"

or represent "and/or" unless the content clearly indicates otherwise. As used herein, the terminology "and/or" includes any and all combinations of one or more of the associated listed items. It should also be understood that when used in this disclosure, the terminologies "include" and/or "comprise" indicate the presence of the described features, regions, overall scenarios, steps, operations, elements, and/or components but do not exclude the presence or addition of one or more other features, regions, overall scenarios, steps, operations, elements, components, and/or combinations thereof.

Figure 1:
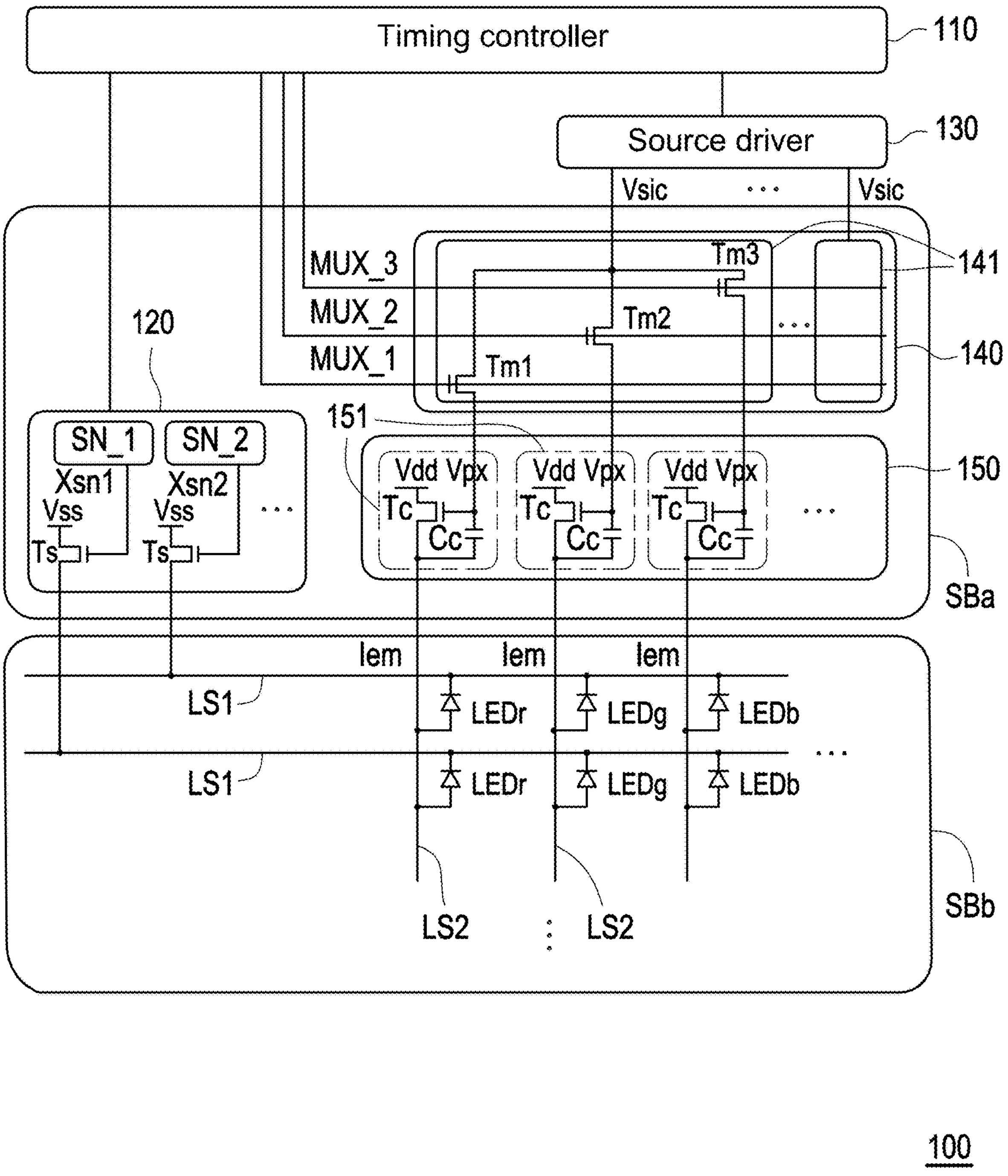
FIG. 1 is a schematic diagram of a system of a passive display apparatus according to a first embodiment of the disclosure.

FIG. 1 is a schematic diagram of a system of a passive display apparatus according to a first embodiment of the disclosure. Please refer to FIG. 1. In this embodiment, a passive display apparatus 100 includes, for example, multiple light-emitting elements, a timing controller 110, a scanning circuit 120, a source driver 130, a multiplexer circuit 140, a current control circuit 150, a first substrate SBa, and a second substrate SBb. The light-emitting elements include, for example, multiple red light-emitting diodes LEDr, multiple green light-emitting diodes LEDg, and multiple blue light-emitting diodes LEDb arranged in an array.

In this embodiment, the scanning circuit 120, the multiplexer circuit 140, and the current control circuit 150 are, for example, located on the first substrate SBa, and these red light-emitting diodes LEDr, green light-emitting diodes LEDg, and blue light-emitting diodes LEDb are located on the second substrate SBb. The second substrate SBb is further provided with multiple first signal lines LS1 and multiple second signal lines LS2 coupled to the red light-emitting diode LEDr, the green light-emitting diode LEDg, and the blue light-emitting diode LEDb. The first signal line LS1 is extended in a horizontal direction, and the second signal line LS2 is extended in a vertical direction.

The source driver 130 is coupled to the timing controller 110 to provide multiple pixel reference voltages Vsic based on a signal (such as a control signal and display data) provided by the timing controller 110. The multiplexer circuit 140 is coupled to the timing controller 110, the source driver 130, and the current control circuit 150, and receives the pixel reference voltages Vsic from the source driver 130 and multiple multiplex control signals (such as MUX_1 to MUX_3) from the timing controller 110. The multiplexer circuit 140 generates multiple pixel voltages Vpx corresponding to a row of the light-emitting elements (such as the red light-emitting diode LEDr, the green light-emitting diode LEDg, and the blue light-emitting diode LEDb) based on the control signals MUX_1 to MUX_3 and the received pixel reference voltages Vsic, and provides the pixel voltages Vpx to the current control circuit 150 in parallel.

The scanning circuit 120 is coupled to the timing controller 110 and coupled to the red light-emitting diode LEDr, the green light-emitting diode LEDg, and the blue light-emitting diode LEDb by the first signal line LS1, and has multiple scan shift registers (such as SN_1 to SN_2) and multiple scanning switches Ts (here, a transistor is taken as an example). The scan shift registers (such as SN_1 to SN_2) controlled by the signal provided by the timing controller 110 generates multiple scan signals (such as Xsn1 to Ssn2) enabled sequentially, and the scan signals are correspondingly provided to the scanning switches Ts. A first terminal of the scanning switch Ts receives a first operating voltage Vss. A control terminal of the scanning switch Ts receives the scan signal (such as Xsn1 to Ssn2) correspondingly. A second terminal of the scanning switch Ts is coupled to a corresponding first signal line LS1. When the scanning switch Ts is turned on based on the enabled scan signal (such as Xsn1 to Ssn2), the first operating voltage Vss is transmitted to a corresponding first signal line LS1 by the turned on scanning switch Ts, thereby providing the first operating voltage Vss to the red light-emitting diode LEDr, the green light-emitting diode LEDg, and the blue light-emitting diode LEDb row by row.

The current control circuit 150 is coupled to the multiplexer circuit 140, coupled to the red light-emitting diode LEDr, the green light-emitting diode LEDg, and the blue light-emitting diode LEDb by the second signal line LS2, and receives the pixel voltages Vpx from the multiplexer circuit 140 to provide multiple light-emitting currents Iem to the red light-emitting diode LEDr, the green light-emitting diode LEDg, and the blue light-emitting diode LEDb by the second signal line LS2. The red light-emitting diode LEDr, the green light-emitting diode LEDg, and the blue light-emitting diode LEDb emit light based on the received light-emitting currents Iem.

Based on the above, only the light-emitting elements (that is, the red light-emitting diodes LEDr, the green light-emitting diodes LEDg, and the blue light-emitting diodes LEDb) and traces (that is, the first signal line LS1 and the second signal line LS2) are retained in a pixel array substrate (that is, the second substrate SBb), and the related driving elements are moved to a control substrate (that is, the first substrate SBa), which means that the first substrate SBa is still a low temperature poly-silicon substrate, but the second substrate SBb may be a non-low temperature poly-silicon substrate and may reduce the overall area of the low-temperature poly-silicon substrate, that is, reducing the overall hardware cost. Moreover, only the light-emitting elements and the traces are retained in the pixel array (that is, the second substrate SBb), the resolution of the pixel array may be greatly improved. Furthermore, since only the light-emitting elements and the traces are retained in the pixel array (that is, the second substrate SBb), detecting the pixel array is easy. The first substrate SBa mainly detects the signal and the current of the scanning circuit 120, and is therefore easy to detect, so that the yield rate is improved.

In this embodiment, the multiplexer circuit 140 includes multiple multiplexers 141, and each multiplexer 141 may include multiple multiplex switches (such as Tm1 to Tm3). Here, the multiplex switches take three transistors Tm1 to Tm3 as an example. In each multiplexer 141, the first terminals of the transistors Tm1 to Tm3 receive the same pixel reference voltage Vsic, the control terminals of the transistors Tm1 to Tm3 individually receive one of the multiplex control signals MUX_1 to MUX_3, and the second terminals of the transistors Tm1 to Tm3 individually provide the corresponding pixel voltage Vpx.

In this embodiment, the current control circuit 150 includes multiple current generating blocks 151. Each current generating block 151 includes a current exchange transistor Tc and a capacitor Cc. The current exchange transistor Tc has a first terminal receiving a second operating voltage Vdd, a control terminal receiving the corresponding pixel voltage Vpx, and a second terminal providing the corresponding light-emitting current Iem. The second operating voltage Vdd may be different from the first operating voltage Vss. The capacitor Cc is coupled between the control terminal and the second terminal of the current exchange transistor Tc.

In the embodiment of the disclosure, the second operating voltage Vdd may be greater than the first operating voltage Vss, but the embodiment of the disclosure is not limited thereto.

Figure 2:
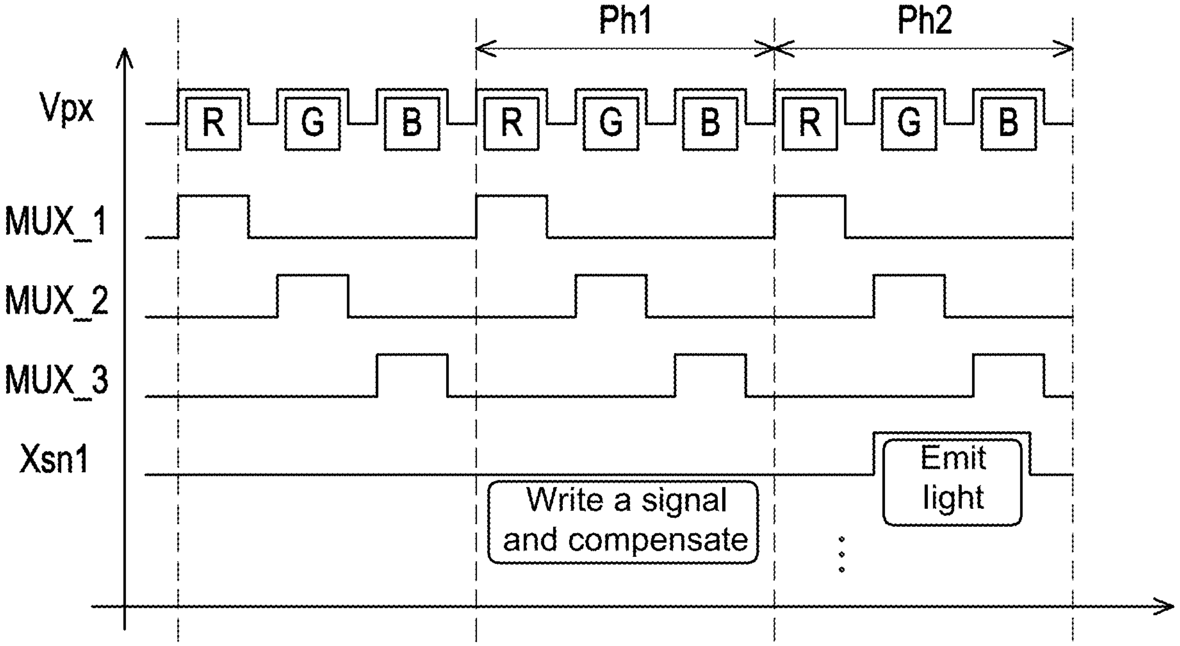
FIG. 2 is a schematic diagram of a driving waveform of a passive display apparatus according to the first embodiment of the disclosure.

FIG. 2 is a schematic diagram of a driving waveform of a passive display apparatus according to the first embodiment of the disclosure. Please refer to FIG. 1 and FIG. 2. In a horizontal period (such as Ph1 and Ph2), the control signals MUX_1 to MUX_3 are enabled sequentially without being overlapped, so that the pixel voltage Vpx (represented by R) corresponding to the red light-emitting diode LEDr is transmitted to the current generating block 151 corresponding to the red light-emitting diode LEDr, the pixel voltage Vpx (represented by G) corresponding to the green light-emitting diode LEDg is transmitted to the current generating block 151 corresponding to the green light-emitting diode LEDg, and the pixel voltage Vpx (represented by B) corresponding to the blue light-emitting diode LEDb is transmitted to the current generating block 151 corresponding to the blue light-emitting diode LEDb.

Taking the scan signal Xsn1 as an example, when the scan signal Xsn1 is not enabled (for example, at a low voltage level), the signal may be written and voltage compensation may be performed (such as an action in the horizontal period Ph1). When the scan signal Xsn1 is enabled (for example, at a high voltage level), the light-emitting element may emit light (such as an action in the horizontal period Ph2).

Figure 3:
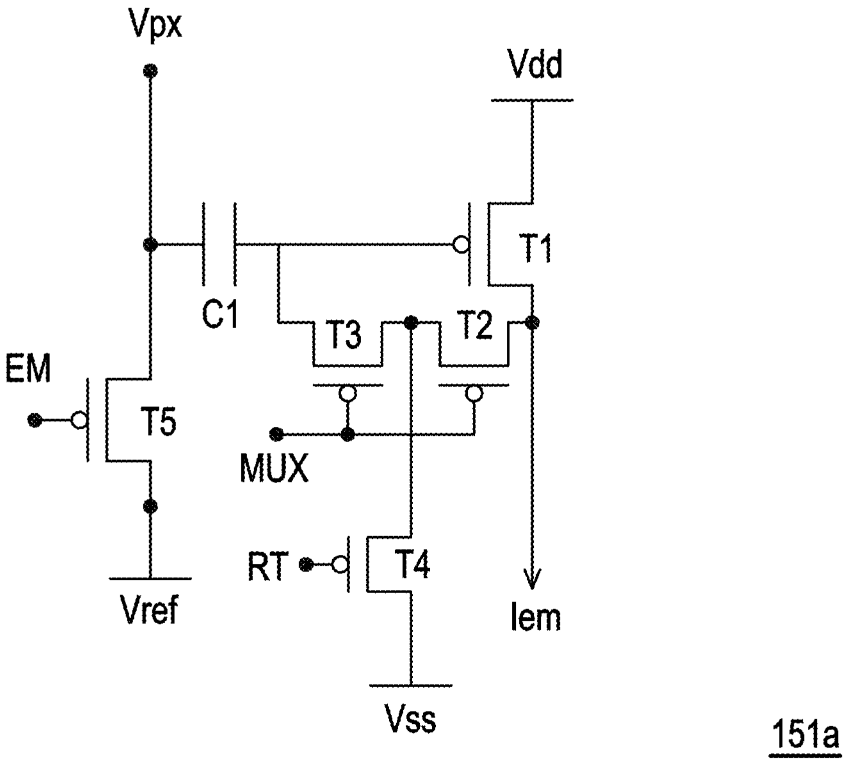
FIG. 3 is a schematic diagram of a circuit of a current generating block according to another embodiment of the disclosure.

FIG. 3 is a schematic diagram of a circuit of a current generating block according to another embodiment of the disclosure. Referring to FIG. 1 to FIG. 3, in this embodiment, a current generating block 151*a* may be configured to replace the current generating block 151, and the current generating block 151*a* includes, for example, a first transistor T1, a second transistor T2, a third transistor T3, a fourth transistor T4, a fifth transistor T5, and a first capacitor C1.

The first transistor T1 has a first terminal receiving the second operating voltage Vdd, a control terminal, and a second terminal providing a corresponding light-emitting current Iem. The first capacitor C1 is coupled between a corresponding pixel voltage Vpx and the control terminal of the first transistor T1. The second transistor T2 has a first terminal, a control terminal receiving the multiplex control signal MUX (such as one of the control signals MUX_1 to MUX_3), and a second terminal coupled to the second terminal of the first transistor T1. The third transistor T3 has a first terminal coupled to the control terminal of the first transistor T1, a control terminal receiving the multiplex control signal MUX, and a second terminal coupled to the first terminal of the second transistor T2. The fourth transistor T4 has a first terminal coupled to the first terminal of the second transistor T2, a control terminal receiving a reset signal RT, and a second terminal receiving the first operating voltage Vss. The fifth transistor T5 has a first terminal receiving a corresponding pixel voltage Vpx, a control terminal receiving a light-emitting signal EM, and a second terminal receiving a reference voltage Vref.

Figure 4:
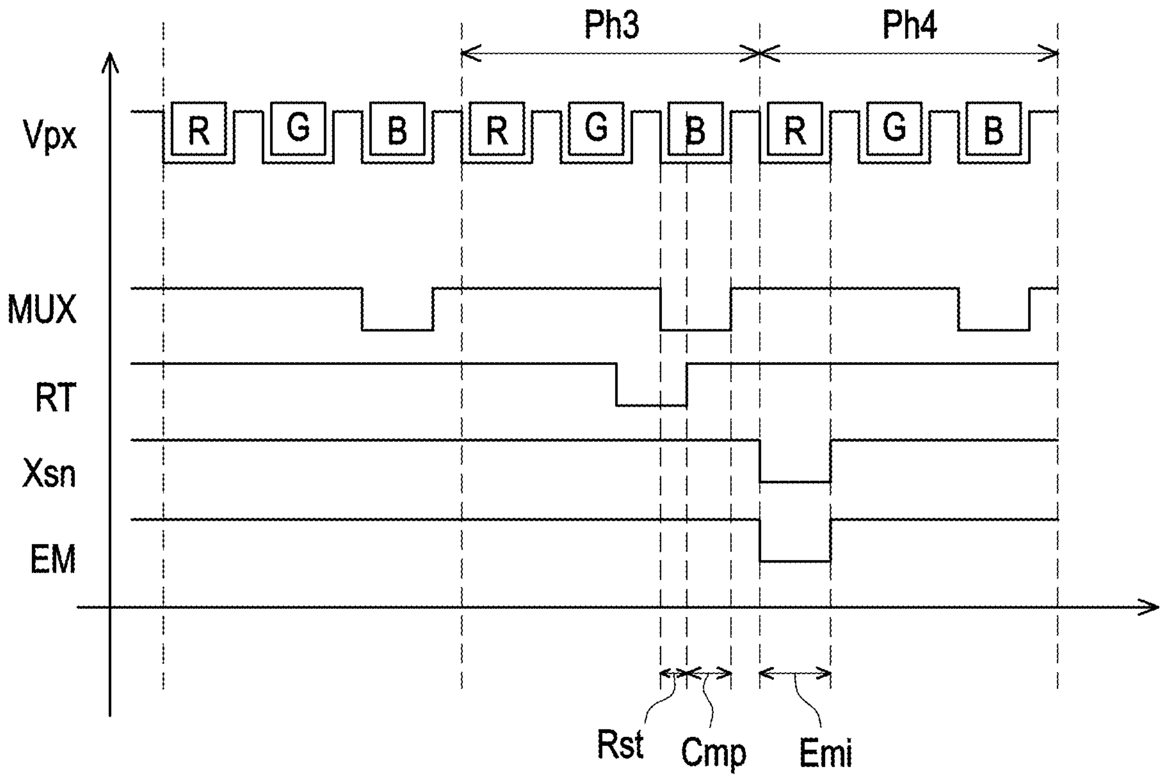
FIG. 4 is a schematic diagram of a driving waveform of a current generating block according to another embodiment of the disclosure.

FIG. 4 is a schematic diagram of a driving waveform of a current generating block according to another embodiment of the disclosure. Please refer to FIG. 3 and FIG. 4. In this embodiment, in a first horizontal period Ph3, the fourth transistor T4 is controlled by the enable of the reset signal RT (for example, at a low voltage level) and is turned on to release a charge between the second transistor T2 and the third transistor T3 during a reset period Rst. Next, when the reset signal RT and the multiplex control signal MUX are both enabled, the control terminal and the second terminal of the first transistor T1 are connected to the first operating voltage Vss to reset the state of the first transistor T1.

Next, when only the reset signal RT is enabled, the voltage stored in the first capacitor C1 during a compensation period Cmp is related to a critical voltage of the first transistor T1 and the pixel voltage Vpx (for example, corresponding to the blue light-emitting diode LEDb), thereby compensating the critical voltage of the first transistor T1. Afterwards, in a second horizontal period Ph4, when a corresponding scan signal Xsn (such as one of the scan signals Xsn1 to Ssn2) and the light-emitting signal EM are both enabled, the fifth transistor T5 is turned on, and a current path is formed between the second operating voltage Vdd and the first operating voltage Vss, so that the light-emitting element (such as the blue light-emitting diode LEDb) emits light during a light-emitting period Emi.

Figure 5:
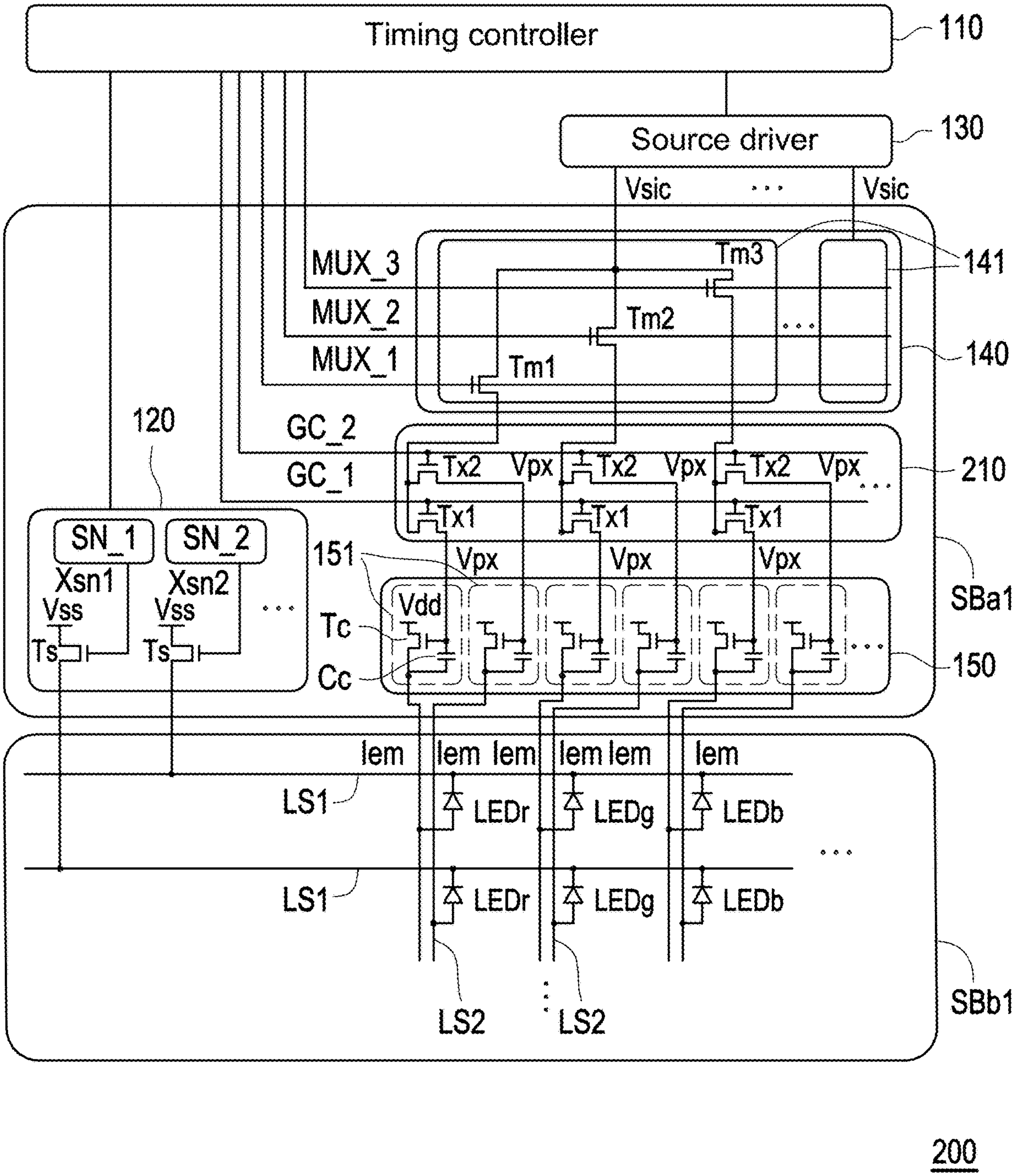
FIG. 5 is a schematic diagram of a system of a passive display apparatus according to a second embodiment of the disclosure.

FIG. 5 is a schematic diagram of a system of a passive display apparatus according to a second embodiment of the disclosure. Please refer to FIG. 1 and FIG. 5, in which a passive display apparatus 200 is substantially the same as the passive display apparatus 100, and the same or similar elements are labeled with the same or similar reference numerals. In this embodiment, the passive display apparatus 200 further includes a timing control circuit 210 disposed on the first substrate SBa1. The timing control circuit 210 is coupled between the multiplexer circuit 140 and the current control circuit 150 and receives the pixel voltage Vpx and multiple timing control signals (such as GC_1 to GC_2), and the timing control circuit 210 alternatively provides the pixel voltages Vptx to the current generating block 151 of the current control circuit 150 based on the timing control signals (such as GC_1 to GC_2).

Further, the timing control circuit 210 includes, for example, multiple first timing transistors Tx1 and multiple second timing transistors Tx2. The first timing transistor Tx1 has a first terminal receiving a corresponding pixel voltage Vpx, a control terminal receiving the timing control signal GC_1, and a second terminal coupled to a corresponding second signal line LS2. The second timing transistor Tx2 has a first terminal receiving a corresponding pixel voltage Vpx, a control terminal receiving the timing control signal GC_2, and a second terminal coupled to a corresponding second signal line LS2.

In a second substrate SBb1, the second signal lines LS2 coupled to the light-emitting elements (such as the red light-emitting diodes LEDr, the green light-emitting diodes LEDg, and the blue light-emitting diodes LEDb) in odd rows are different from the second signal lines LS2 coupled to of the light-emitting elements (such as the red light-emitting diode LEDr, the green light-emitting diode LEDg, and the blue light-emitting diode LEDb) in even rows.

Figure 6:
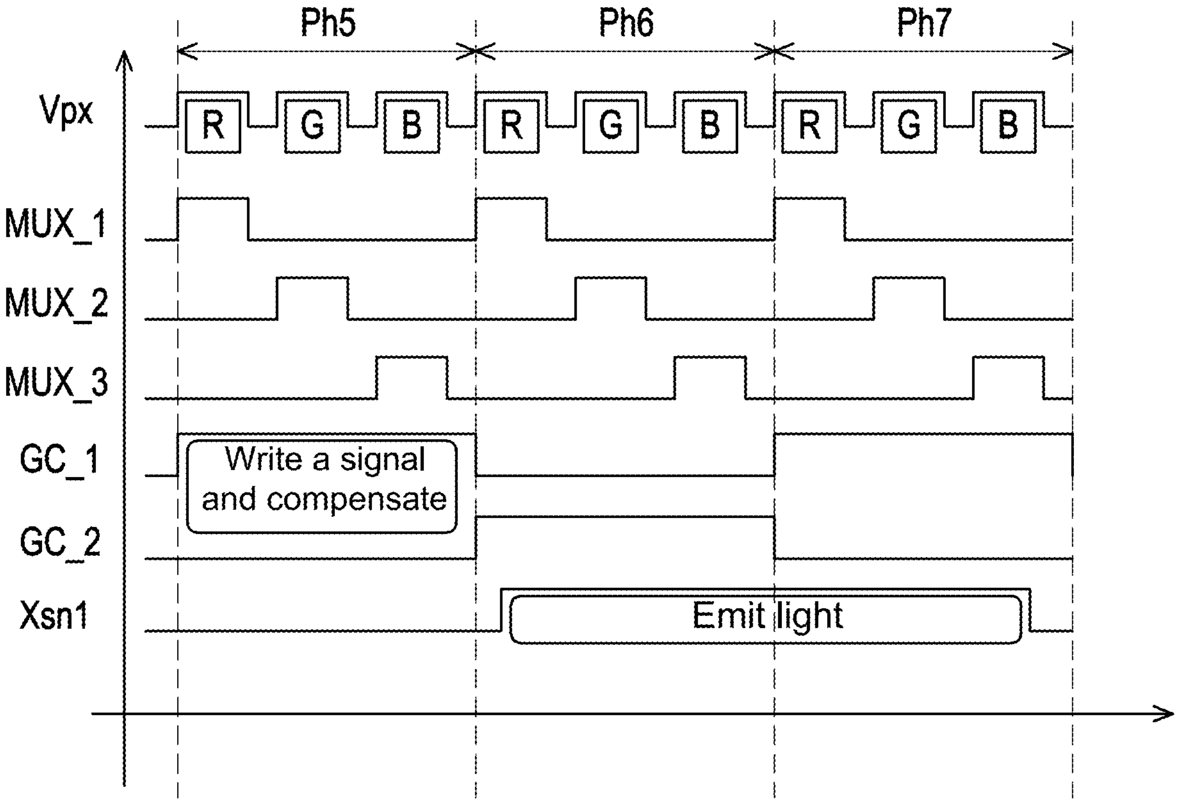
FIG. 6 is a schematic diagram of a driving waveform of a passive display apparatus according to the second embodiment of the disclosure.

FIG. 6 is a schematic diagram of a driving waveform of a passive display apparatus according to the second embodiment of the disclosure. Please refer to FIG. 5 and FIG. 6. In a horizontal period Ph5, the timing control signal GC1 is enabled (for example, at a high voltage level), so that an odd number of current generating blocks 151 of the current control circuit 150 receive a corresponding pixel voltage Vpx and performs signal writing and compensation. Next, in a horizontal period Ph6, the timing control signal GC1 is disabled (for example, at a low voltage level), but the scan signal Xsn1 is enabled, so that the light-emitting elements (such as the red light-emitting diode LEDr, the green light-emitting diode LEDg, and the blue light-emitting diode LEDb) in a first row continues to emit light. Afterwards, in a horizontal period Ph7, the scan signal Xsn1 remains enabled, so that the light-emitting elements (such as the red light-emitting diode LEDr, the green light-emitting diode LEDg, and the blue light-emitting diode LEDb) in the first row continues to emit light. Thereby, through the operation of the timing control circuit 210, the light-emitting elements (such as the red light-emitting diode LEDr, the green light-emitting diode LEDg, and the blue light-emitting diode LEDb) may have a longer light-emitting time.

Figure 7:
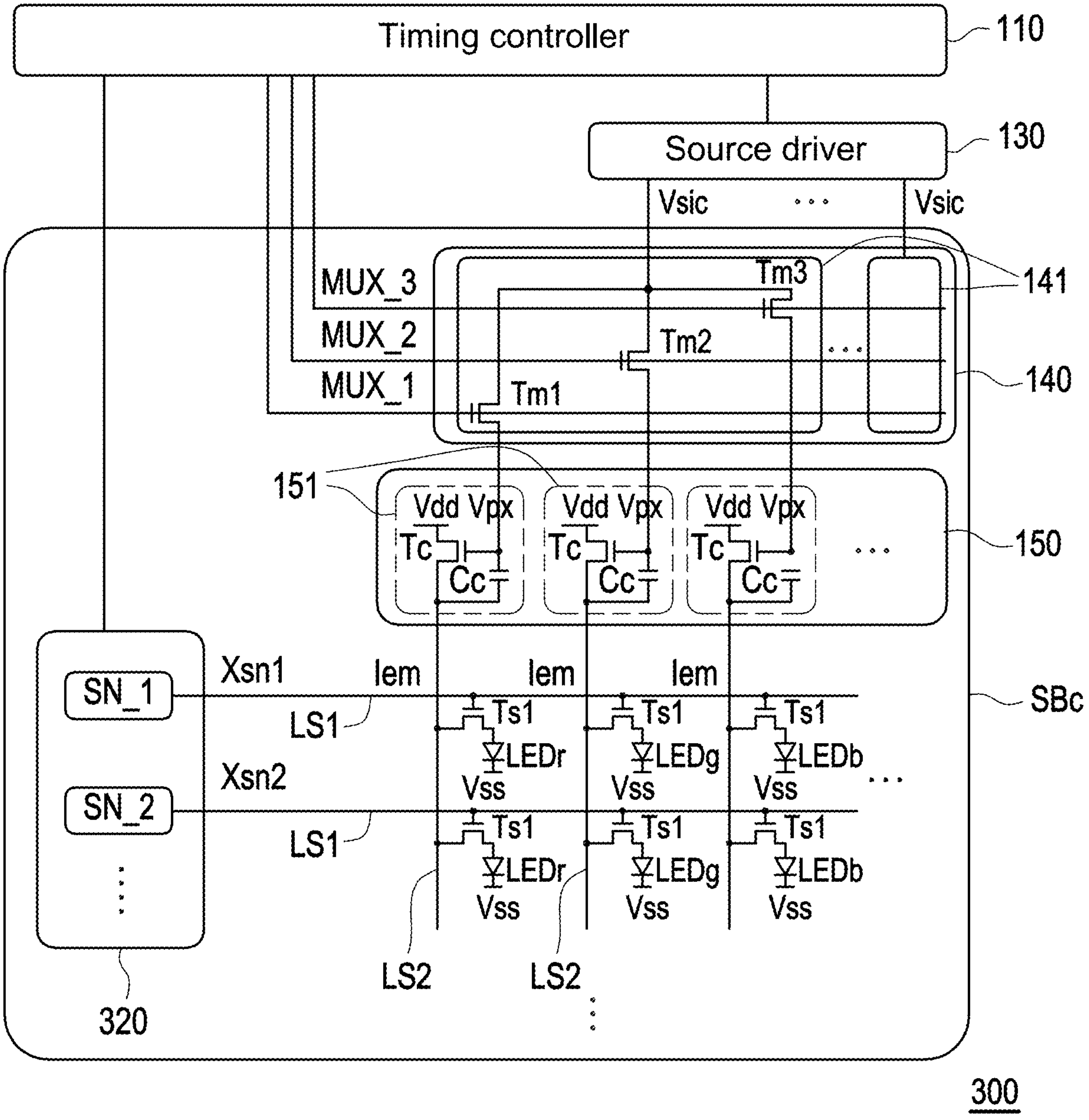
FIG. 7 is a schematic diagram of a system of a passive display apparatus according to a third embodiment of the disclosure.

FIG. 7 is a schematic diagram of a system of a passive display apparatus according to a third embodiment of the disclosure. Please refer to FIG. 1 and FIG. 7, in which a passive display apparatus 300 is substantially the same as the passive display apparatus 100, and the same or similar elements are labeled with the same or similar reference numerals. In this embodiment, the light-emitting elements (such as the red light-emitting diode LEDr, the green light-emitting diode LEDg, and the blue light-emitting diode LEDb), a scanning circuit 320, the multiplexer circuit 140, the current control circuit 150, and the scanning switch Ts1 are disposed on the same substrate SBc, where the scanning circuit 320 is only provided with the scan shift registers (such as SN_1 to SN_2). The first terminal of each scanning switch Ts1 is coupled to a corresponding second signal line LS2, the control terminal of the scanning switch Ts1 is coupled to a corresponding first signal line LS1, and the second terminal of the scanning switch Ts is coupled to a corresponding anode of the light-emitting elements (such as the red light-emitting diode LEDr, the green light-emitting diode LEDg, and the blue light-emitting diode LEDb), and a cathode of the light-emitting elements (such as the red light-emitting diode LEDr, the green light-emitting diode LEDg, and the blue light-emitting diode LEDb) receives the first operating voltage Vss.

Figure 8:
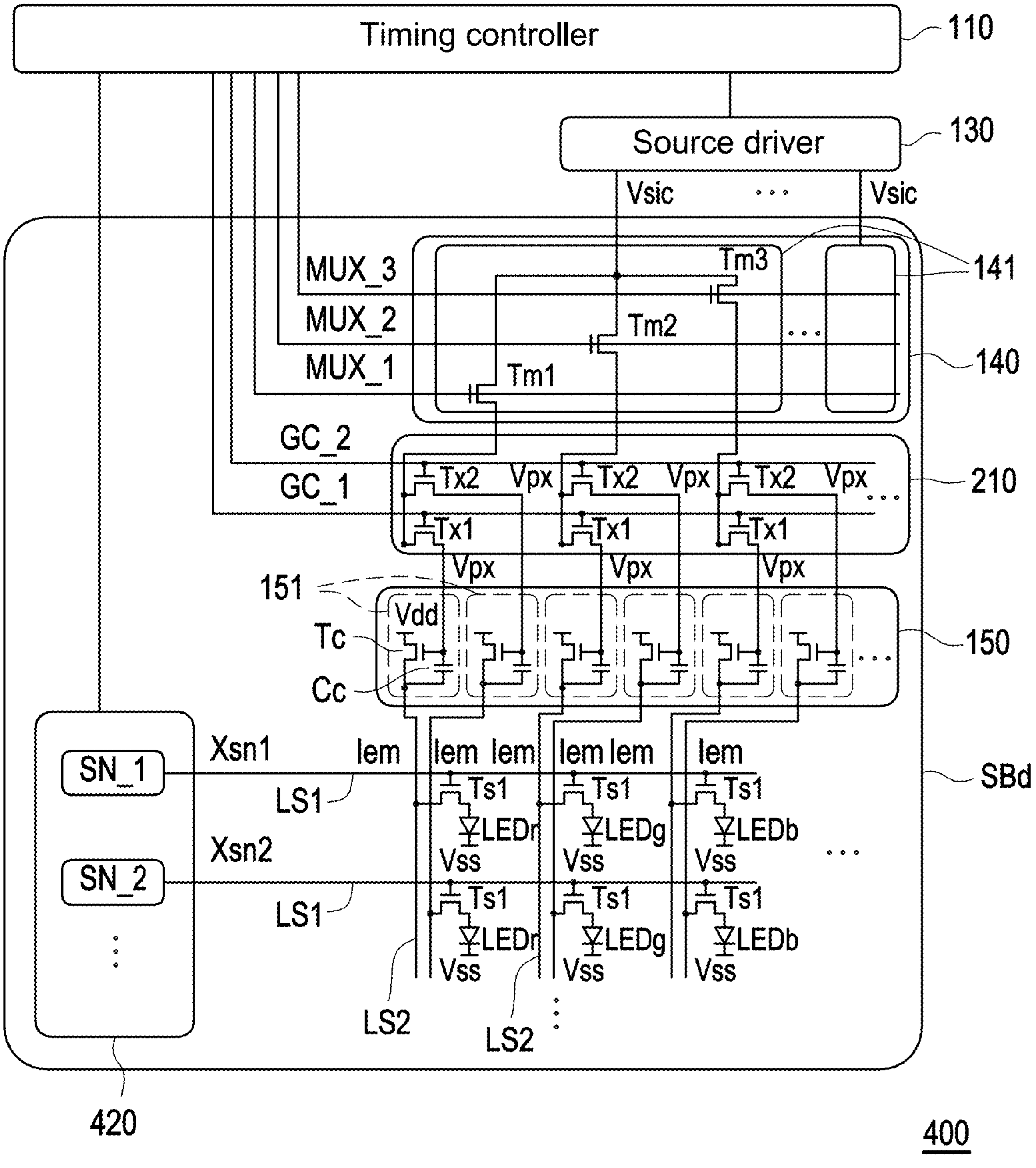
FIG. 8 is a schematic diagram of a system of a passive display apparatus according to a fourth embodiment of the disclosure.

FIG. 8 is a schematic diagram of a system of a passive display apparatus according to a fourth embodiment of the disclosure. Please refer to FIG. 1, FIG. 5, and FIG. 8, in which a passive display apparatus 400 is substantially the same as the passive display apparatus 200, and the same or similar elements are labeled with the same or similar reference numerals. In this embodiment, the light-emitting elements (such as the red light-emitting diodes LEDr, the green light-emitting diodes LEDg, and the blue light-emitting diodes LEDb), a scanning circuit 420, the multiplexer circuit 140, the current control circuit 150, the timing control circuit 210, and the scanning switch Ts1 are disposed on the same substrate SBd, where the scanning circuit 420 is only provided with the scan shift registers (such as SN_1 to SN_2). The first terminal of each scanning switch Ts1 is coupled to a corresponding second signal line LS2, the control terminal of the scanning switch Ts1 is coupled to a corresponding first signal line LS1, and the second terminal of the scanning switch Ts1 is coupled to a corresponding anode of the light-emitting elements (such as the red light-emitting diode LEDr, the green light-emitting diode LEDg, and the blue light-emitting diode LEDb), and the cathode of the light-emitting elements (such as the red light-emitting diode LEDr, the green light-emitting diode LEDg, and the blue light-emitting diode LEDb) receives the first operating voltage Vss.

To sum up, in the passive display apparatus according to the embodiments of the disclosure, only the light-emitting elements and the traces are retained in the pixel array, and the relevant driving elements are moved to the periphery. In this way, the resolution of the pixel array may be greatly improved, and the complexity of detection may be simplified, so that the yield rate of the panel may be improved.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A passive display apparatus, comprising:
- a plurality of light-emitting elements, arranged in an array;
- a scanning circuit, coupled to the plurality of light-emitting elements and having a plurality of scan shift registers to generate a plurality of scan signals enabled sequentially;
- a plurality of scanning switches, receiving the plurality of scan signals and a first operating voltage to provide the first operating voltage to the plurality of light-emitting elements row by row; and
- a current control circuit, coupled to the plurality of light-emitting elements and receiving a plurality of pixel voltages to provide a plurality of light-emitting currents to the plurality of light-emitting elements, wherein the plurality of light-emitting elements emit light based on the received light-emitting currents, wherein the current control circuit comprises:
- a plurality of current generating blocks, individually comprising:
  - a first transistor, having a first terminal receiving a second operating voltage, a control terminal, and a second terminal providing a corresponding light-emitting current;
  - a first capacitor, coupled between a corresponding pixel voltage and the control terminal of the first transistor;
  - a second transistor, having a first terminal, a control terminal receiving a multiplex control signal, and a second terminal coupled to the second terminal of the first transistor;
  - a third transistor, having a first terminal coupled to the control terminal of the first transistor, a control terminal receiving the multiplex control signal, and a second terminal coupled to the first terminal of the second transistor;
  - a fourth transistor, having a first terminal coupled to the first terminal of the second transistor, a control terminal receiving a reset signal, and a second terminal receiving the first operating voltage; and
  - a fifth transistor, having a first terminal receiving a corresponding pixel voltage, a control terminal receiving a light-emitting signal, and a second terminal receiving a reference voltage.

2. The passive display apparatus according to claim 1, further comprising a multiplexer circuit coupled to the current control circuit and receiving a plurality of pixel reference voltages and a plurality of multiplex control signals to generate the plurality of pixel voltages based on the plurality of multiplex control signals and the plurality of pixel reference voltages and provide the plurality of pixel voltages to the plurality of current generating blocks.

3. The passive display apparatus according to claim 2, further comprising a timing control circuit coupled between the multiplexer circuit and the current control circuit and receiving the plurality of pixel voltages and a plurality of timing control signals to provide the plurality of pixel voltages to the plurality of current generating blocks alternately based on the plurality of timing control signals.

4. The passive display apparatus according to claim 1, further comprising:
- a first substrate and a second substrate;

wherein the scanning circuit and the current control circuit are located on the first substrate, and the plurality of light-emitting elements are located on the second substrate.

5. The passive display apparatus according to claim 1, further comprising:

a substrate;

wherein the scanning circuit, the current control circuit, and the plurality of light-emitting elements are located on the substrate.

6. The passive display apparatus according to claim 1, wherein the plurality of light-emitting elements comprise a plurality of red light-emitting diodes, a plurality of green light-emitting diodes, and a plurality of blue light-emitting diodes.

* * * * *